Figure 3:
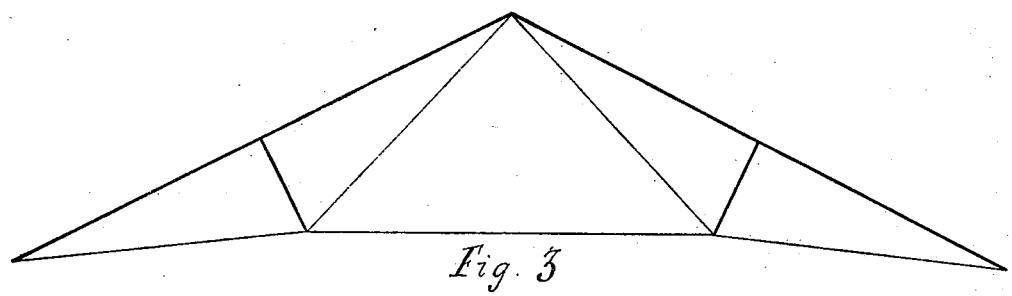

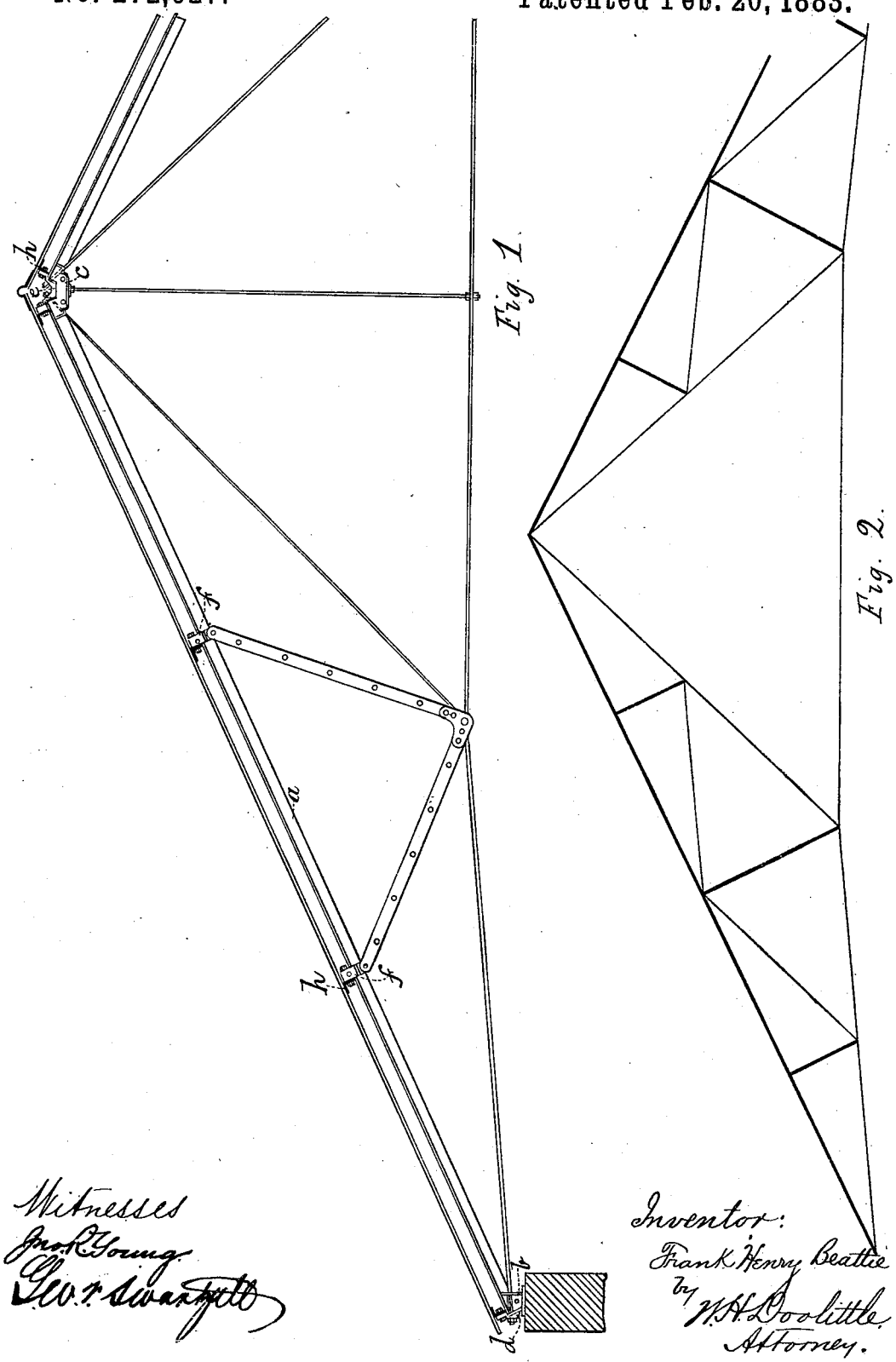

(No Model.)　　　　　　　F. H. BEATTIE.　　　11 Sheets—Sheet 2.
BRACED FRAME.

No. 272,627.　　　　　　　　Patented Feb. 20, 1883.

Witnesses:　　　　　　　　　Inventor:
Jno. R. Young　　　　　　　Frank Henry Beattie
G. W. F. Swantell　　　　　by W. H. D. Little
　　　　　　　　　　　　　　Att'y.

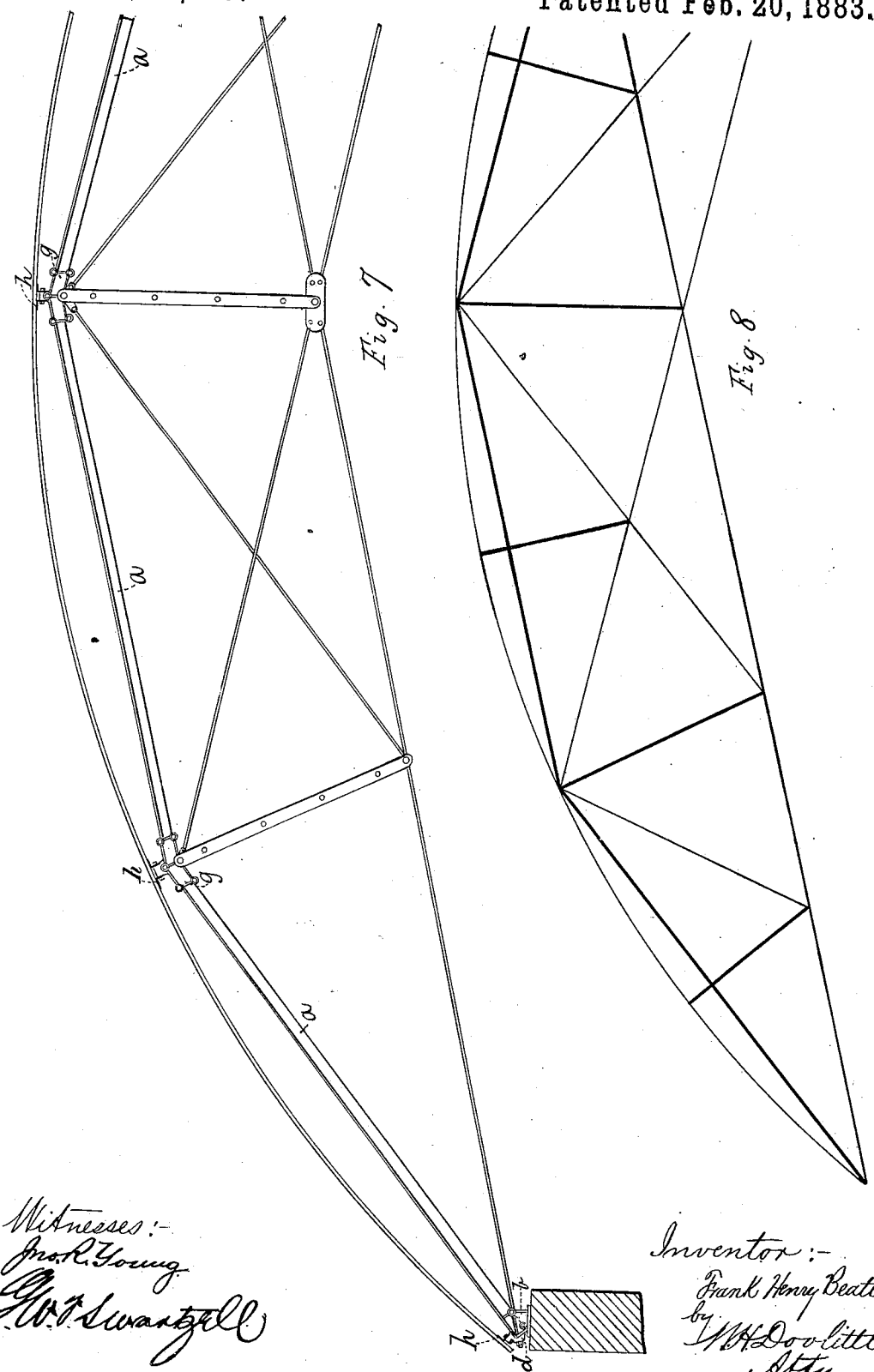

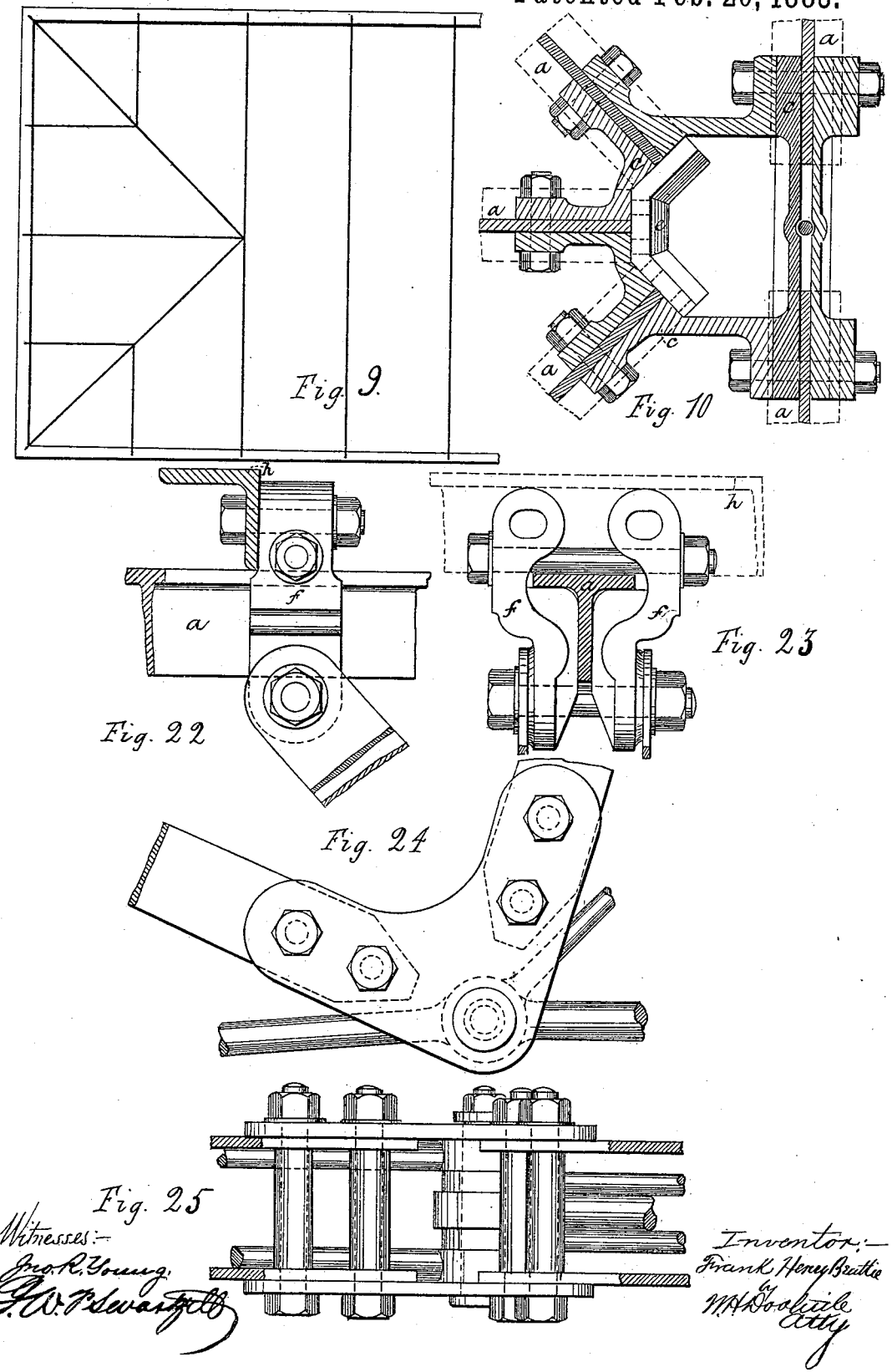

(No Model.)
11 Sheets—Sheet 5.
F. H. BEATTIE.
BRACED FRAME.
No. 272,627.
Patented Feb. 20, 1883.
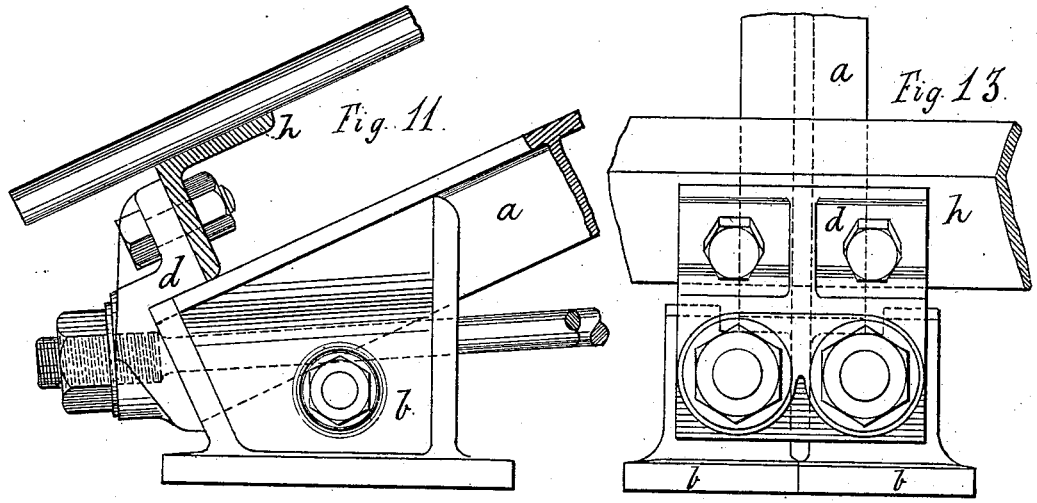
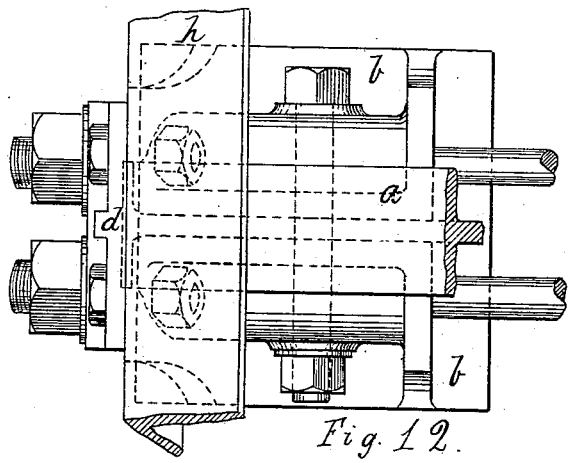
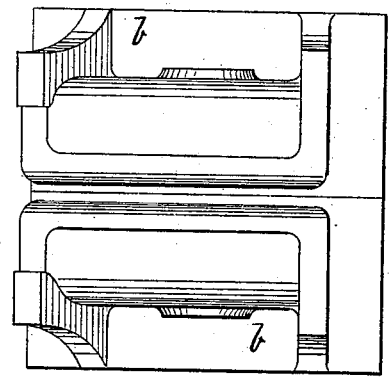
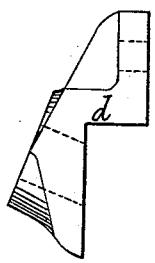
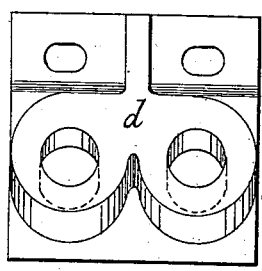
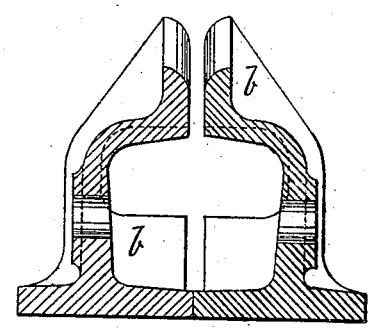
Witnesses:
Jno. R. Young
G. W. P. Swan
Inventor:—
Frank Henry Beattie
by W. H. Doolittle
Atty.

(No Model.)
F. H. BEATTIE.
BRACED FRAME.
No. 272,627. Patented Feb. 20, 1883.
11 Sheets—Sheet 6.
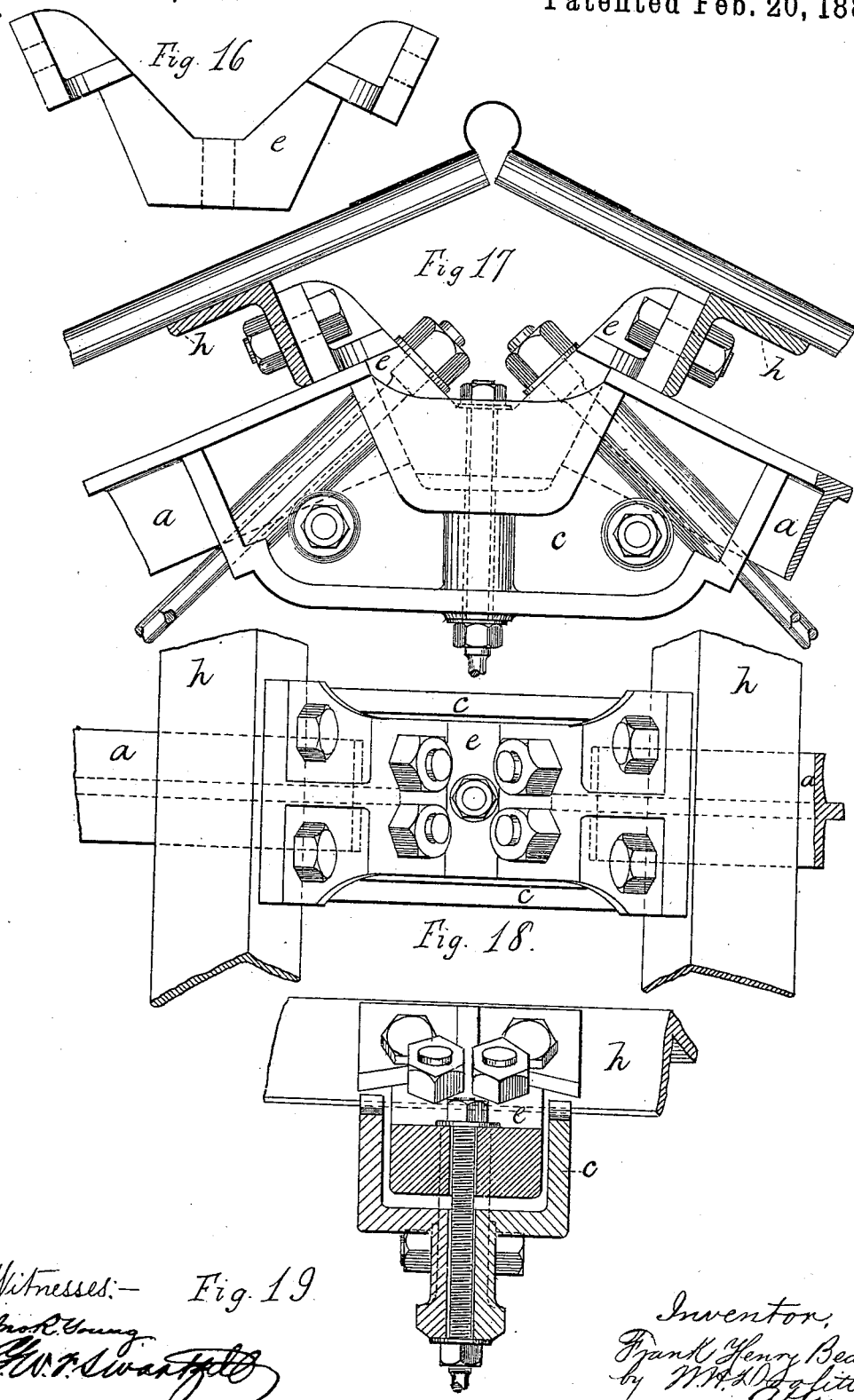

(No Model.) 11 Sheets—Sheet 7.

F. H. BEATTIE.
BRACED FRAME.

No. 272,627. Patented Feb. 20, 1883.

Witnesses:
Jno. R. Young
G. W. F. Swartz

Inventor:
Frank Henry Beattie
by M. H. Doolittle
Atty.

N. PETERS. Photo-Lithographer, Washington, D. C.

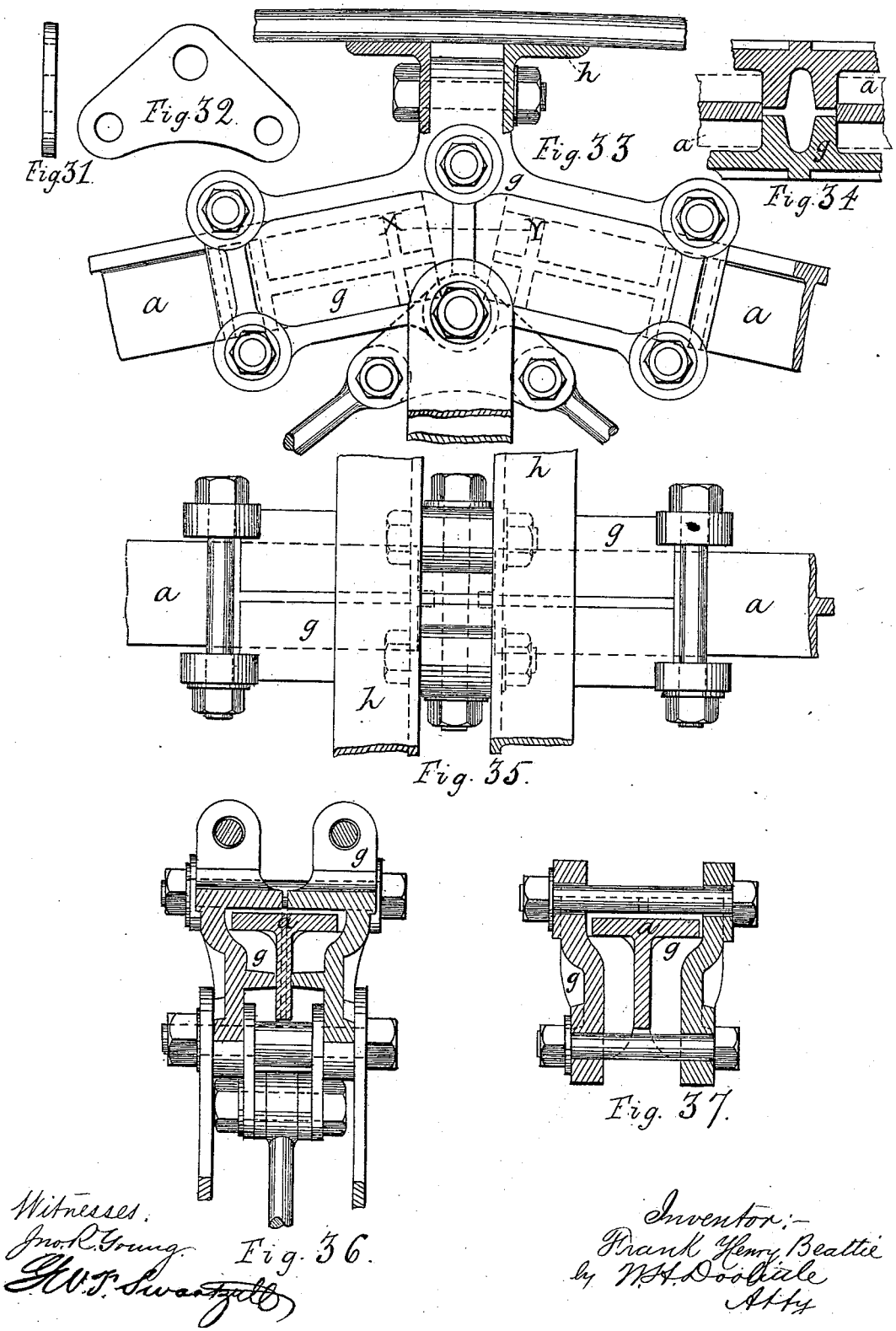

(No Model.) 11 Sheets—Sheet 9.

F. H. BEATTIE.
BRACED FRAME.

No. 272,627. Patented Feb. 20, 1883.

Witnesses:

Inventor:—
Frank Henry Beattie
by M. H. Doolittle
Atty.

(No Model.)  F. H. BEATTIE.  11 Sheets—Sheet 10.
BRACED FRAME.

No. 272,627.  Patented Feb. 20, 1883.

Witnesses:-  Inventor:-
Frank Henry Beattie
by M. H. Doolittle
Atty.

(No Model.) 11 Sheets—Sheet 11.
F. H. BEATTIE.
BRACED FRAME.
No. 272,627. Patented Feb. 20, 1883.
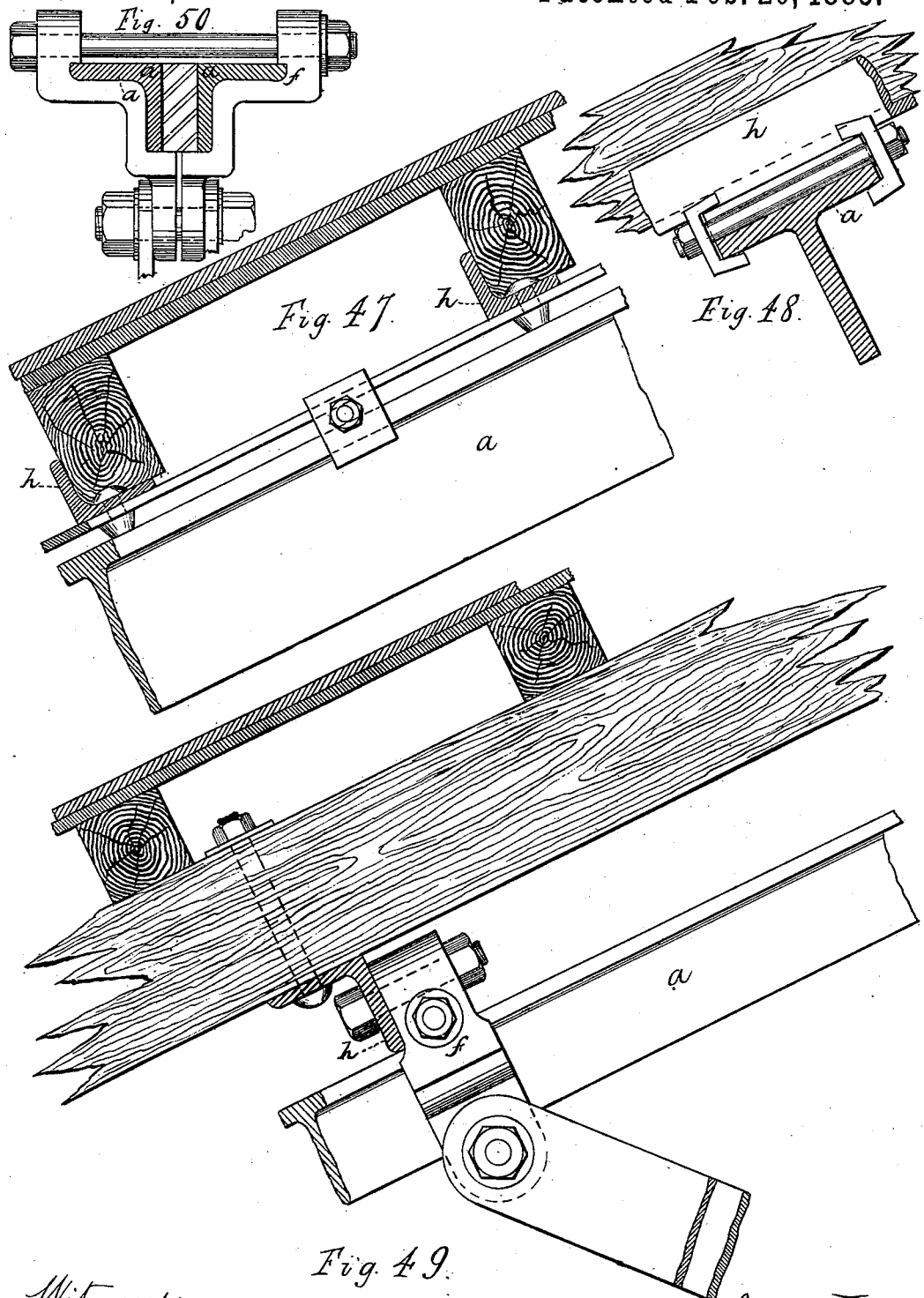
Witnesses:
Inventor:
Frank Henry Beattie
by W. H. Doolittle
Att'y

UNITED STATES PATENT OFFICE.

FRANK HENRY BEATTIE, OF SOHO, NEAR BIRMINGHAM, COUNTY OF WARWICK, ENGLAND.

BRACED FRAME.

SPECIFICATION forming part of Letters Patent No. 272,627, dated February 20, 1883.

Application filed May 16, 1882. (No model.) Patented in England August 8, 1881, No. 3,428.

*To all whom it may concern:*

Be it known that I, FRANK HENRY BEATTIE, a subject of the Queen of Great Britain and Ireland, residing at Soho, near Birmingham, in the county of Warwick, Kingdom of Great Britain and Ireland, have invented new and useful Improvements in Braced Frames, (for which I have obtained a patent in Great Britain, No. 3,428, bearing date August 8, 1881,) of which the following is a specification.

My invention relates to braced frames to be used as roof principals or as girders for certain kinds of light bridge-work and the like, and particularly to such as are either mainly or entirely composed of iron or steel, or of both metals conjointly, and in which the compression-booms consist of simple rolled bars of T, angle, or other suitable section.

The object of my invention is to diminish the weight and cost of such braced frames without impairing their strength and efficiency.

Hitherto it has been usual to make holes in the compression-booms for the purpose of connecting the accessory parts thereto. Such holes diminish the strength of the compression-booms and increase the cost of production. According to my invention the several portions of the frame are connected together by clipping devices in such wise that all such holes as above mentioned are avoided, lighter sections of compression-booms can be employed than when there are such holes, and the cost of making such holes is saved. I employ clipping devices which firmly grip the compression-booms for the purpose of connecting them to the accessory parts in such a manner as to avoid diminishing the sectional areas of the compression-booms by means of holes or otherwise, and I also employ abutment-pieces, which are held firmly against the ends of the compression-booms by the tie-bars of the structures to which they belong, and which are so constructed as to assist in binding together various members of such respective structures.

The accompanying drawings, contained on eleven sheets, illustrate the application of this invention to roof principals.

Figures 4, 5:
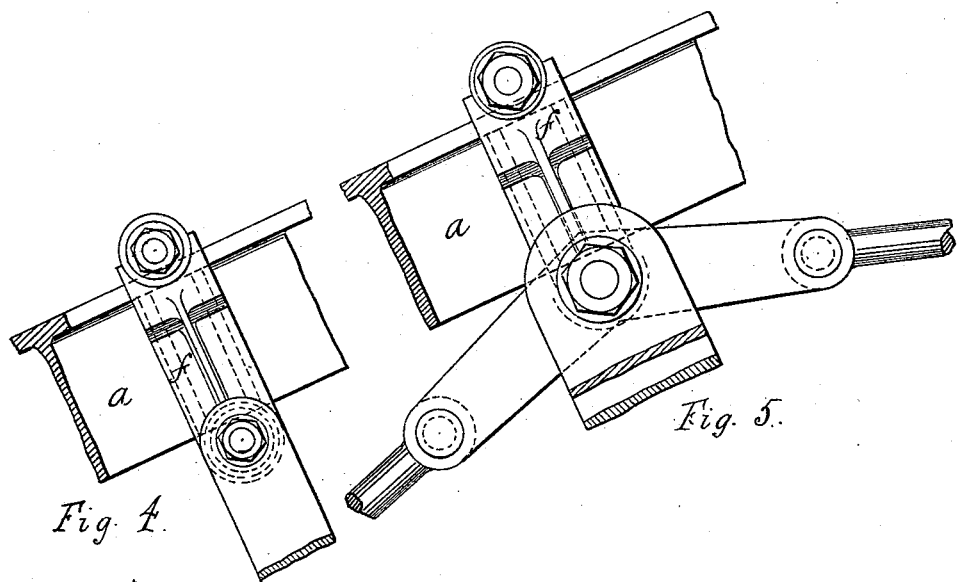
Figure 6:
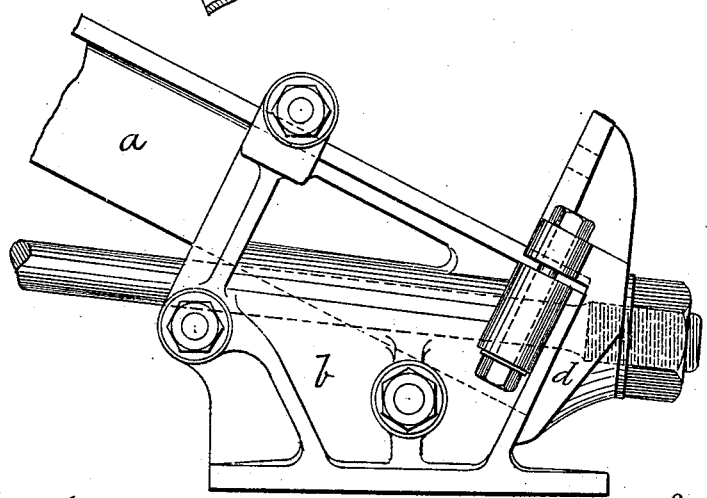
Figure 26:
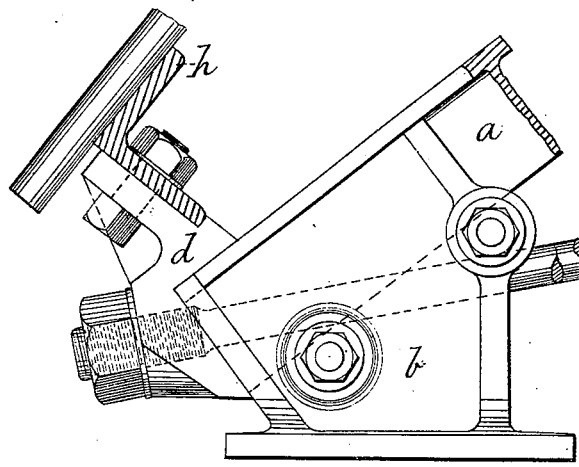
Figure 28:
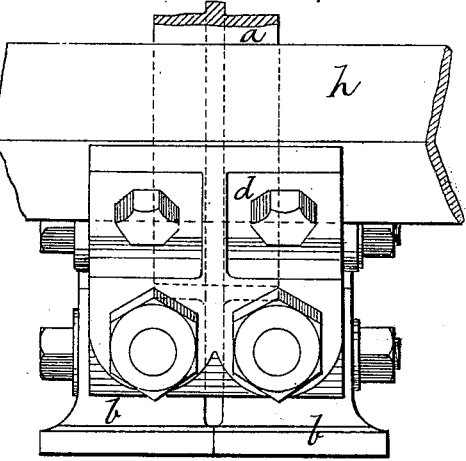
Figure 27:
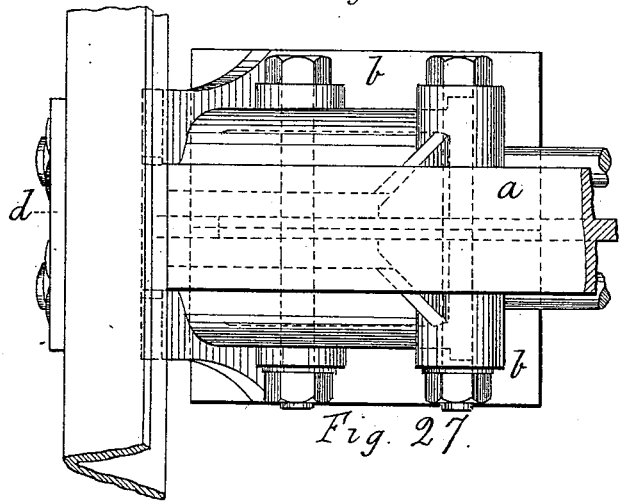
Figure 29:
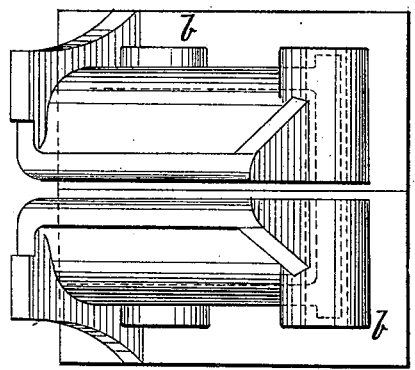
Figure 38:
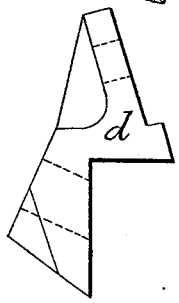
Figure 39:
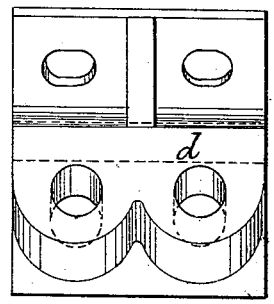
Figure 30:
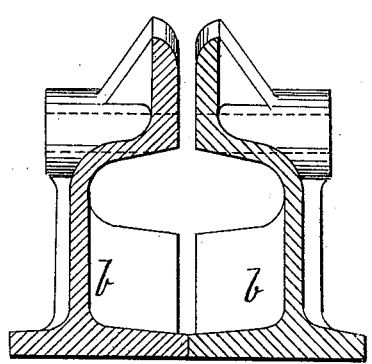
Figure 40:
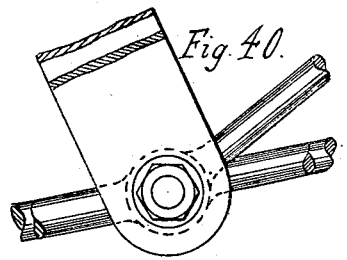
Figure 42:
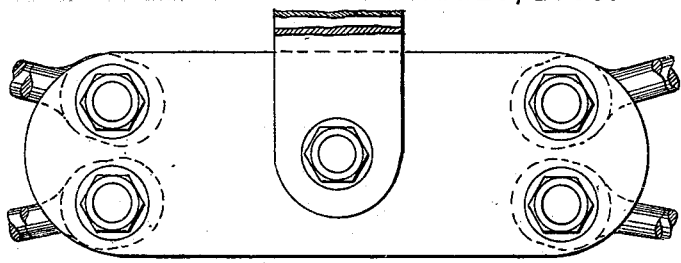
Figure 41:
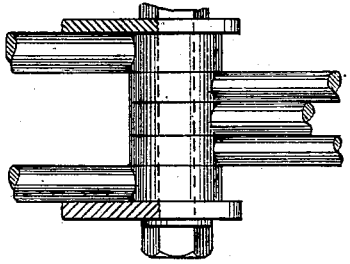
Figure 43:
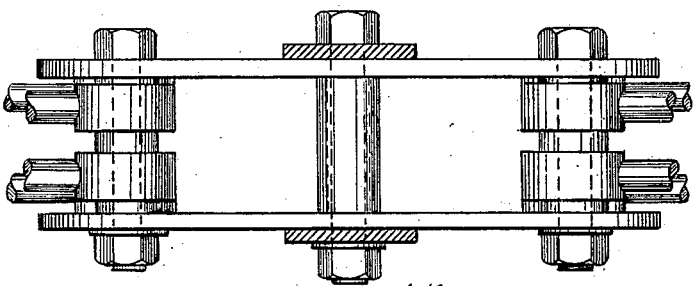
Figure 46:
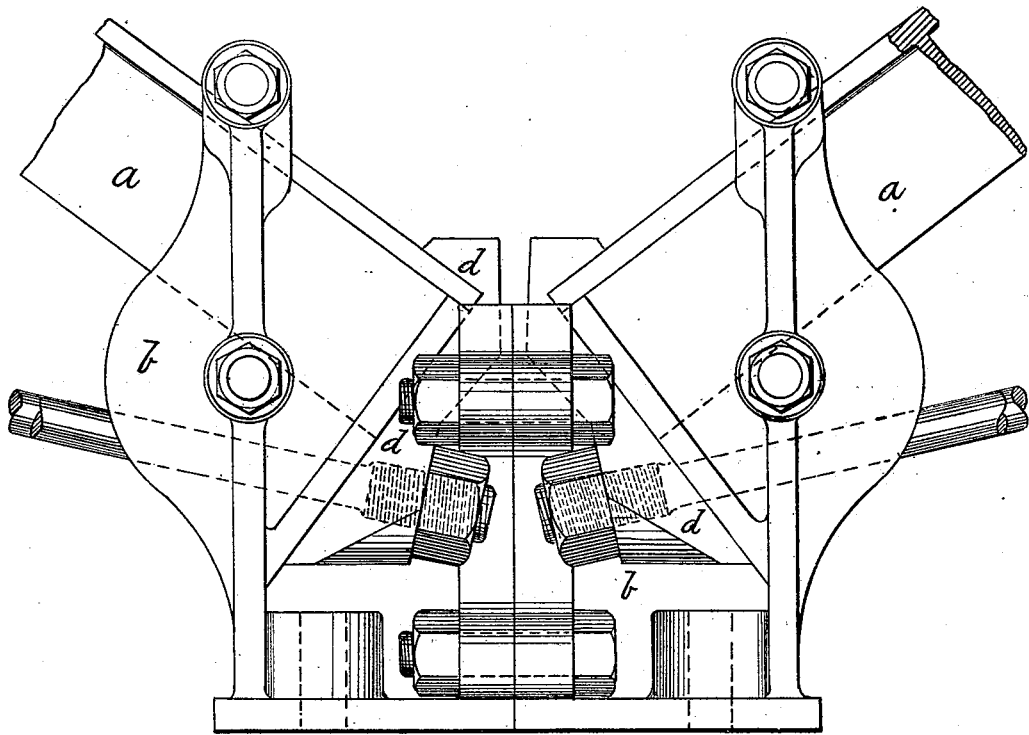
Figure 44:
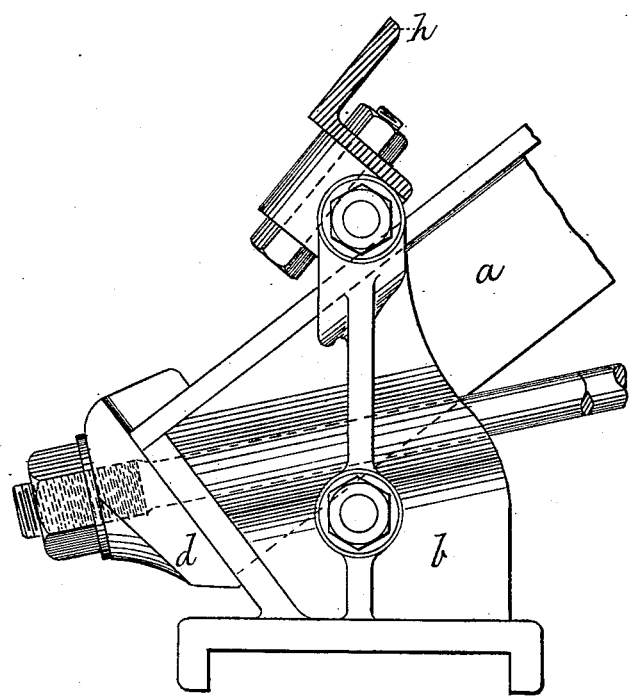
Figure 45:
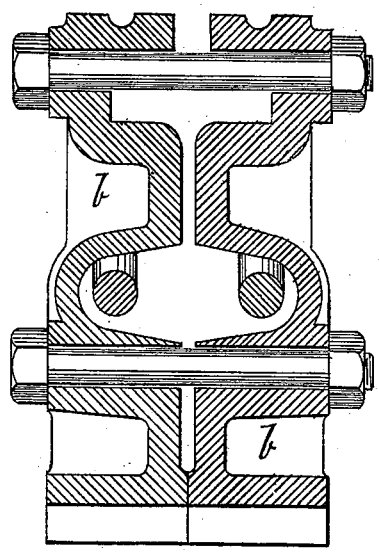

Figure 1 shows a braced frame suitable for a principal for a pitched roof, arranged according to this invention. Figs. 11, 12, and 13 are respectively an enlarged side elevation, plan, and end elevation of the shoes and abutment-pieces for the lower ends of the compression-booms of this braced frame. Fig. 14 is an enlarged plan of the shoes alone. Fig. 15 is an enlarged section of the same. Figs. 20 and 21 are enlarged views of the abutment-pieces at the lower ends of the compression-booms. Figs. 17, 18, and 19 are respectively an enlarged side elevation, plan, and section of the king-head and of the abutment-piece at the upper ends of the compression-booms in this braced frame. Fig. 16 is an enlarged side view of the last-named abutment-piece alone. Figs. 22 and 23 are enlarged views of the attachments by which the struts are connected to the compression-booms in this braced frame. Figs. 24 and 25 are enlarged views, showing the method by which the ties and struts are connected to each other in this braced frame. Fig. 2 is a diagram of a braced frame suitable for a pitched-roof principal differently braced to that shown in Fig. 1, but to which the same king-head may be applied. Figs. 4 and 5 are enlarged views of the attachments by which the struts are connected to the compression-booms in a braced frame of this design. Fig. 6 is an enlarged side elevation of the shoes and abutment-pieces for the lower ends of the compression-booms of this braced frame. Fig. 3 is a diagram of a braced frame suitable for a pitched-roof principal of a third design, to which the shoes and king-heads, as for Fig. 1, and the strut-connection shown in Fig. 4 are applicable. Fig. 7 shows a braced frame for a curved roof, arranged according to this invention. Figs. 26, 27, 28, 29, 30, 38, and 39 are enlarged views of the shoes and abutment-pieces of this braced frame, corresponding respectively to Figs. 11, 12, 13, 14, 15, 20, and 21. Fig. 33 is an enlarged side elevation of the attachments which couple the compression-booms together in this braced frame, and which also serve as abutment-pieces for the ends of the compression-booms. Fig. 35 is an enlarged plan of same. Figs. 36 and 37 are two enlarged cross-sections of same. Fig. 34 is an enlarged sectional plan on the line $x\,y$ in Fig. 33. Figs. 31 and 32 are enlarged views of plates which are used for connecting the tie-rods to the compression-booms in this principal at the center of the span. Figs. 40, 41, 42, and 43 are enlarged views, showing the respective methods by which the various connections of the ties and struts to each other are made in this braced frame. Fig. 8 is a diagram showing an alternative system for bracing a frame suitable for a curved-roof principal, to which the shoes and compression-boom couplings, as for Fig. 7, and the attachments for struts shown in Fig. 4 are applicable. Fig. 9 is a diagram plan of a braced frame suitable for a hipped roof. Fig. 10 is an enlarged sectional plan of a king-head and of an abutment-piece at the upper ends of the hipped rafters, showing the method of attaching this king-head to that of a braced frame suitable for an ordinary pitched-roof principal. Fig. 44 is an enlarged side elevation of a shoe, and of the corresponding abutment-piece at the lower end of one of the compression-booms, suitable for a braced frame of larger span than that shown in Fig. 1. Fig. 45 is an enlarged cross-section through the said shoe. Fig. 46 is an enlarged side elevation, showing an arrangement of two shoes and of the corresponding abutment-pieces for two braced frames, which are placed end to end so as to make successive spans. Figs. 47 and 48 are enlarged views, showing one method of applying a slated roof to a braced frame without making holes in the compression-booms. Fig. 49 is an enlarged view, showing another method of attaining the same object. Fig. 50 is an enlarged view, showing an attachment for connecting a strut to a compression-boom when the compression-boom is made up of two bars of any rolled section placed side by side.

In these drawings the compression-booms are lettered $a$, the shoes $b$, the king-heads $c$, the abutment-pieces at the lower ends of the compression-booms $d$, the abutment-pieces at the upper ends of the compression-booms $e$, the attachments for connecting the struts to the compression-booms $f$, the attachments for coupling the compression-booms in curved roofs $g$, and the purlins $h$.

The shoes $b$, king-heads $c$, strut attachments $f$, and compression-boom couplings $g$ are formed as pairs of clipping devices, which are made to clip the compression-booms $a$, and are secured in their places thereupon by means of bolts, as shown, which do not pass through the compression-booms, the objects of this method of attaching the said parts being mainly to avoid all necessity for diminishing the sectional areas of the compression-booms by the making of holes or otherwise, and to save the cost of making such holes in or other diminution of the sectional areas of the compression-booms.

Fig. 50 shows an alternative strut attachment according to which the compression-boom is made in two parts, which are kept at any required distance from each other by a distance-piece placed between them. If desired, the two parts of the compression-boom may be allowed to touch each other. The shoes, king-heads, and compression-boom couplings, according to this invention, may all be applied to compression-booms of this description.

The tie-rods shown in Figs. 11, 12, 13, 26, 27, 28, 44, 45, and 46 pass through the shoes $b$ and through holes in the abutment-pieces $d$, and are tightened up by means of nuts which bear upon the abutment-pieces, as shown. The tightening up of the tie-rods causes the abutment-pieces to be forced hard against the lower ends of the compression-booms $a$, and at the same time causes the hooked parts of the abutment-pieces (see Fig. 20) to be forced firmly downward upon the compression-booms. The tie-rods shown in Figs. 17, 18, and 19 pass through the king-heads $c$ and through holes in the abutment-piece $e$, and are tightened up by means of nuts which bear upon the abutment-piece, as shown. The tightening up of the tie-rods causes the abutment-piece $e$ to be forced hard against the upper ends of the two compression-booms $a$ $a$, and at the same time causes the two hooked parts of the abutment-piece to be forced firmly downward upon the compression-booms.

It will be readily seen that in a braced frame constructed with shoes, king-heads, and abutment-pieces, in the manner just described, the tightening up of the tie-rods causes the whole structure to become firmly bound together.

The compression-boom couplings shown in Figs. 33, 34, 35, 36, and 37 have abutment-pieces formed upon them (see Fig. 34) to receive the thrust of the compression-booms. The tie-rods and struts are connected to the compression-boom couplings, as shown in Figs. 35 and 36.

In Fig. 10 a king-head of similar construction to that shown in Figs. 17, 18, and 19 has the king-head of the hipped rafters (which is made in four parts all bolted together) bolted to it, as shown. Fig. 6 shows the abutment-piece, for greater security, bolted to the shoe-pieces, and both in this figure and in Fig. 44 extra bolts (as compared with the arrangement in Fig. 11) are shown for bolting the respective shoe-pieces to each other. These modifications are applicable when the length of span or other circumstances render the arrangement shown in Fig. 11 inadequate to meet the case. When two braced frames are fixed end to end, as shown in Fig. 46, the two adjacent shoes are bolted together, as shown in this figure.

In order to avoid the making of holes in the compression-booms for securing the roof-purlins $h$ in their places, and to save the expense of making the holes, either the shoes or the king-heads, or the attachments for the struts, or the abutment-pieces, or the compression-boom couplings, or all or any of them, may be formed or provided with projections or parts to which the purlins may be bolted or otherwise secured. Examples of this are shown in Figs. 1, 6, 7, 11, 12, 13, 16, 17, 18, 19, 20, 21, 22, 23, 26, 27, 28, 33, 35, 36, 38, 39, 44, 45, and 49. In Figs. 47 and 48 the purlins are shown riveted to strips which are secured to the compression-booms by means of clipping devices and bolts, as shown.

It will be seen that according to the arrangements described in this specification and illustrated in the accompanying eleven sheets of drawings, the compression-booms are formed with their ends at right angles to the lines of thrust, so as to press squarely against the respective abutment-pieces, and that these compression-booms are in straight lengths. It will be further seen that no reduction whatever is made in the sectional areas of the compression-booms, either by holes or otherwise, and that in consequence such sectional areas may respectively be less than those which would be necessary if the compression-booms were perforated with holes by the extent to which such holes would reduce the effective sectional areas of the respective perforated compression-booms; or, in other words, that when a compression-boom arranged according to this invention is used, instead of a perforated one, the sectional area of the former need not exceed that of the weakest part of the latter.

The arrangements herein described, and illustrated by the accompanying drawings, as applicable to roof principals, may also be used (with or without slight modifications in details, according to the circumstances of the case) for other braced frames—such as girders for certain kinds of light bridge-work and the like—the main object being to do away with all holes in the compression-booms and to save the cost of making the holes.

I do not claim as my invention the methods illustrated for connecting struts and tie-rods to each other; nor those for applying slated or other roofs to roof principals.

What I do claim is—

1. As a new article of manufacture, a foot-piece or shoe formed of two castings, each adapted to be applied to a T-shaped compression-boom anywhere along one side thereof, and perforated for the reception of a transverse binding-bolt, substantially as shown and described.

2. The combination, with an imperforate T-shaped compression-boom, of a shoe comprising two plates adapted to fit the edges and sides of the boom, and a binding-bolt, substantially as shown and described.

3. The combination of an imperforate T-shaped compression-boom, a shoe comprising two plates adapted to embrace the edges and sides thereof, a transverse binding-bolt, and an abutment-piece, as $d$, secured to the end of the two-part shoe, substantially as shown and described.

FRANK HENRY BEATTIE.

Witnesses:
WILLIAM SIMMONS ALLEN,
*Solicitor, 35 Waterloo Street, Birmingham.*
VINCENT SWIFT,
*Clerk to the above William Simmons Allen, 35 Waterloo Street, Birmingham.*